United States Patent
Moon et al.

(10) Patent No.: US 7,188,107 B2
(45) Date of Patent: Mar. 6, 2007

(54) SYSTEM AND METHOD FOR CLASSIFICATION OF DOCUMENTS

(75) Inventors: Charles Moon, Round Rock, TX (US); Vasken Torossian, Round Rock, TX (US)

(73) Assignee: Infoglide Software Corporation, Austin, TX (US)

( * ) Notice: Subject to any disclaimer, the term of this patent is extended or adjusted under 35 U.S.C. 154(b) by 280 days.

(21) Appl. No.: 10/248,962

(22) Filed: Mar. 5, 2003

(65) Prior Publication Data

US 2003/0177118 A1  Sep. 18, 2003

Related U.S. Application Data

(60) Provisional application No. 60/319,138, filed on Mar. 6, 2002.

(51) Int. Cl.
*G06F 17/30* (2006.01)
(52) U.S. Cl. .......................................................... 707/5
(58) Field of Classification Search ............. 707/1, 707/2, 10, 200, 104.1, 5; 704/9
See application file for complete search history.

(56) References Cited

U.S. PATENT DOCUMENTS

| | | | |
|---|---|---|---|
| 6,233,575 B1 | 5/2001 | Agrawal et al. | |
| 6,516,308 B1 | 2/2003 | Cohen | |
| 6,792,420 B2* | 9/2004 | Chen et al. | 707/3 |
| 2002/0022956 A1* | 2/2002 | Ukrainczyk et al. | 704/9 |
| 2003/0101181 A1* | 5/2003 | Al-Kofahi et al. | 707/7 |
| 2003/0163485 A1* | 8/2003 | Goodwin et al. | 707/104.1 |

\* cited by examiner

*Primary Examiner*—Etienne P. LeRoux
(74) *Attorney, Agent, or Firm*—Taylor Russell & Russell, P.C.

(57) ABSTRACT

The invention provides a classification engine for classifying documents that makes use of functions included in a similarity search engine. The classification engine executes a classify command from a client that makes use of similarity search results, and rules files, classes files, and a classification profile embedded in the classification command. When the classification receives a classify command from a client, it retrieves a classification profile and input documents to be classified, sends extracted values from the input documents based on anchor values to a XML transformation engine to obtain a search schema, requests a similarity search by a search manager to determine the similarity between input documents and anchor values, and classifies the input documents according to the rules files, classes files, and the classification profile. The client is then notified that the classify command has been completed and the classification results are stored in a database.

33 Claims, 15 Drawing Sheets

```
<INPUT_SEARCH>
    <CLAIM>
        <DOCTOR>
            <NAME>Falstaff</NAME>
        </DOCTOR>
    </CLAIM>
</INPUT_SEARCH>
```

```
<CLASSES>
    <CLASS ID="id">
        <NAME name />
        <RANK rank />
        <LOW_SCORE>low</LOW_SCORE>
        <HIGH_SCORE>high</HIGH_SCORE>
    </CLASS>
</CLASSES>
``` where:
- *id* is an integer that uniquely identifies this class
- *name* is the descriptive name of the class (limited to 40 characters)
- *rank* is an integer indicating the level of the class in the class hierarchy
- *low* is the lower threshold for scores associated with the class (default 0.00)
- *high* is the upper threshold for scores associated with the class (default 1.00)

FIG-3A

```
<CLASS ID="UNC">
    <NAME>Unclassified<NAME/>
    <RANK>99999<RANK/>
</CLASS>
```

FIG-3B

```
<CLASSES>
    <CLASS ID="1">
        <NAME>RED</NAME>
        <RANK>1</RANK>
    </CLASS>
    <CLASS ID="2">
        <NAME>YELLOW</NAME>
        <RANK>2</RANK>
    </CLASS>
    <CLASS ID="3">
        <NAME>BLUE</NAME>
        <RANK>3</RANK>
    </CLASS>
    <CLASS ID="4">
        <NAME>GREEN</NAME>
        <RANK>3</RANK>
    </CLASS>
</CLASSES>
```

FIG-3C

```
<RULES>
    <RULE ID="id">
        <DESCRIPTION text />
        <CONDITION [OP="boolean"]>
            <PROPERTY ID="property">
                <SCHEMA_MAP_ID map />
                <THRESHOLD>
                    <START OP="bottom" lowscore / >
                    <END OP="top" highscore / >
                </THRESHOLD>
                <DOCUMENT_COUNT count/>
            </PROPERTY>
            condition
        </CONDITION>
    </RULE>
</RULES>
``` where  id        is an integer that uniquely identifies this rule
       text      is descriptive text to be used as the default description
       boolean   is AND or OR, indicating how nested conditions are combined
       property  is an integer that uniquely identifies this requirement
       map       is an integer that identifies the map in the SCHEMA_MAP_ID file
       bottom    is ">=" or ">" indicating whether to include *lowscore* in the range
       lowscore  is a similarity score from 0.00 to 1.00 that is lowest in the range
       top       is "<=" or "<" indicating whether to include *highscore* in the range
       highscore is a similarity score from 0.00 to 1.00 that is highest in the range
       count     is the least number of documents required
         condition is a nested condition element (combined with others by *boolean*)

FIG-4A

```
<RULES>
    <RULE ID="1">
        <DESCRIPTION> SANCTIONED Doctors />
        <CONDITION>
            <PROPERTY ID="1" TYPE="SEARCH_SCORE">
                <SCHEMA_MAP_ID> 2 </SCHEMA_MAP_ID>
                <THRESHOLD>
                    <START OP=">=" >.9 </START>
                    <END OP="<=" > 1 </END>
                </THRESHOLD>
                <DOCUMENT_COUNT> 3 </DOCUMENT_COUNT>
            </PROPERTY>
        </CONDITION>
    </RULE>
    <RULE ID="2">
        <DESCRIPTION> SANCTIONED LAWYERS and STOLEN
                VEHICLES  </DESCRIPTION>
        <CONDITION OP="AND">
            <PROPERTY ID="1" TYPE="SEARCH_SCORE">
                <SCHEMA_MAP_ID> 1 </SCHEMA_MAP_ID>
                <THRESHOLD>
                    <START OP=">=" > .9 </START>
                    <END OP="<=" 1 > </END>
                </THRESHOLD>
                <DOCUMENT_COUNT>1</DOCUMENT_COUNT>
            </PROPERTY>
            <PROPERTY ID="2" TYPE="SEARCH_SCORE">
                <SCHEMA_MAP_ID> 3 </SCHEMA_MAP_ID>
                <THRESHOLD>
                    <START OP=">=" > .9 </START>
                    <END OP="<=" 1 > </END>
                </THRESHOLD>
                <DOCUMENT_COUNT> 1 </DOCUMENT_COUNT>
            </PROPERTY>
        </CONDITION>
    </RULE>
</RULES>
```

FIG-4B

```
<CLASS_RULE_MAPS>
    <CLASS_RULE_MAP ID="id" CRITERIA_MATCH_TYPE="type">
        <CLASS_ID ID="class" RULE_MATCH_TYPE="type" >
            <RULE_ID ID="rule" >
                <DESCRIPTION text />
                <PROPERTY ID="property" >
                    <THRESHOLD>
                        <START OP="bottom" lowscore/ >
                        <END OP="top" highscore / >
                    </THRESHOLD>
                    <DOCUMENT_COUNT count/>
                </PROPERTY>
            </RULE>
            <LOW_SCORE>low</LOW_SCORE>
            <HIGH_SCORE>high</HIGH_SCORE>
        </CLASS_ID>
    </CLASS_RULE_MAP>
</CLASS_RULE_MAPS>
``` where
- *id*       is an integer that uniquely identifies a class rule map
- *class*     is the ID for the CLASS in the CLASSES file to which this mapping pertains
- *type*      is "Single" or "Multi" (see below)
- *rule*      is the ID for the RULE in the RULES file to which this mapping pertains
- *text*      is descriptive text to be used to override the default description
- *property* is an integer that uniquely identifies this requirement
- *map*      is an integer that identifies the map in the SCHEMA_MAP_ID file
- *bottom*   is ">=" or ">" indicating whether to include *lowscore* in the range
- *lowscore* is a similarity score from 0.00 to 1.00 that is lowest in the range
- *top*       is "<=" or "<" indicating whether to include *highscore* in the range
- *highscore* is a similarity score from 0.00 to 1.00 that is highest in the range
- *count*    is the least number of documents required
- *low*      is the lower threshold for scores associated with the class (overrides CLASSES)
- *high*     is the upper threshold for scores associated with the class (overrides CLASSES)

FIG-5A

```
<CLASS_RULE_MAPS>
    <CLASS_RULE_MAP ID="1" CRITERIA_MATCH_TYPE="MULTI" >
        <CLASS_ID ID="1" RULE_MATCH_TYPE="SINGLE" >
            <RULE_ID ID="1" />
            <RULE_ID ID="2" />
        </CLASS_ID>
        <CLASS_ID ID="2" RULE_MATCH_TYPE="MULTI"/>
            <RULE_ID ID="1" />
                <PROPERTY ID="1">
                    <THRESHOLD>
                        <START OP=">=" > .8 </START>
```
FIG-5B (continued on next page)

```
            <END OP="<" > .9 </END>
        </THRESHOLD>
        </PROPERTY>
    </RULE_ID>
    <RULE_ID ID="2" />
        <PROPERTY ID="1">
            <DOCUMENT_COUNT 1 />
            <THRESHOLD>
                <START OP=">=" > .8 </START>
                <END OP="<" > .9 </END>
            </THRESHOLD>
        </PROPERTY>
        <PROPERTY ID="2">
            <DOCUMENT_COUNT 2 />
            <THRESHOLD>
                <START OP=">=" > .8 </START>
                <END OP="<" .9 > </END>
            </THRESHOLD>
        </PROPERTY>
    </RULE_ID>
</CLASS_ID>
<CLASS_ID ID="3" RULE_MATCH_TYPE="SINGLE"/>
    <RULE_ID ID="1" />
        <PROPERTY ID="1">
            <THRESHOLD>
                <START OP=">=" > 0 </START>
                <END OP="<" .8 > </END>
            </THRESHOLD>
        </PROPERTY>
    </RULE_ID>
    <RULE_ID ID="2" />
        <PROPERTY ID="1">
            <THRESHOLD>
                <START OP=">=" > 0 </START>
                <END OP="<".8 > </END>
            </THRESHOLD>
        </PROPERTY>
        <PROPERTY ID="2">
            <THRESHOLD>
                <START OP=">=" > 0 </START>
                <END OP="<" > .8 </END>
            </THRESHOLD>
        /PROPERTY>
    </RULE_ID>
</CLASS_ID>
  </CLASS_RULE_MAP>
</CLASS_RULE_MAPS>
```

FIG-5B (continued from previous page)

```
<SCHEMA_MAPPING>
    <MAP ID="id" >
        <SEARCH_SCHEMA schema />
        <XTE_MAP xte />
    </MAP>
</SCHEMA_MAPPING>
``` where  *id*     is an integer that uniquely identifies the map
       *schema* is the name of the schema for the search
       *xte*    is the name of the XTE transformation to apply to the input document

FIG-6A

```
<SCHEMA_MAPPING>
    <MAP ID="1">
        <SEARCH_SCHEMA> STOLEN_VEHICLES </SEARCH_SCHEMA>
        <XTE_MAP> main </XTE_MAP>
    </MAP>
    <MAP ID="2">
        <SEARCH_SCHEMA> SANCTIONED_DOCS </SEARCH_SCHEMA>
        <XTE_MAP> main </XTE_MAP>
    </MAP>
    <MAP ID="3">
        <SEARCH_SCHEMA> SANCTIONED_LAWYERS</SEARCH_SCHEMA>
        <XTE_MAP> main </XTE_MAP>
    </MAP>
</SCHEMA_MAPPING>
```

FIG-6B

```
<CLASSIFICATION_RESULTS>
    <TARGET ID="id" >
        <DATASET datasource="datasource" />
        <SEARCH_RESULTS>
            <SEARCH> map </SEARCH>
            <COUNT> count </COUNT>
        </SEARCH_RESULTS>
    </TARGET>
</CLASSIFICATION_RESULTS>
``` where  *id*         is an integer that uniquely identifies a target location for the results
       *datasource* is the name of a datasource defined in the DATASOURCES file
       *map*        is the identifier of a MAP in the SCHEMA_MAPPING file
       *count*      is an integer representing the number of results to save

FIG-7A

```
<CLASSIFICATION_RESULTS>
    <TARGET ID="1">
        <DATASET datasource="classification_output" />
        <SEARCH_RESULTS>
            <SEARCH > 1 </SEARCH>
            <SEARCH > 2 </SEARCH >
            <COUNT>  20  </COUNT>
        </SEARCH_RESULTS>
    </TARGET>
</CLASSIFICATION_RESULTS>
```

FIG-7B

NORMALIZATION FORMULAS FOR CLASS SCORES

To Normalize score X in threshold range S (Start) to E (End):

$$\text{norm}(X) = (E-S)/(X-S)$$

To Renormalize normalizes score N to Class with LOW_SCORE of L and HIGH_SCORE of H:

$$\text{Class-score}(N) = (H-L)*N+L$$

Combined normalization formula:

$$\text{Class-score}(X) = (H-L)*(E-S)/(X-S)+L$$

FIG 7-C

```
<CLASSIFICATION_PROFILE>
    <PROFILE ID="id">
        <SOURCE_SCHEMA NAME="schema" />
        <TARGET_ID ID="target" />
    </PROFILE>
</CLASSIFICATION_PROFILE>
``` where *id*    is an integer that uniquely identifies the profile
    *schema*    is the name of the schema for the input documents
    *target*    is identifier of an output target in the CLASSIFICATION_RESULTS file

FIG-8A

```
<CLASSIFICATION_PROFILE>
    <PROFILE ID="1">
        <SOURCE_SCHEMA NAME="NEW_CLAIMS" />
        <DATASET ID="1"   />
        <CLASS_RULE_MAP ID="1" />
    </PROFILE>
</CLASSIFICATION_PROFILE>
```

FIG-8B

Test Condition

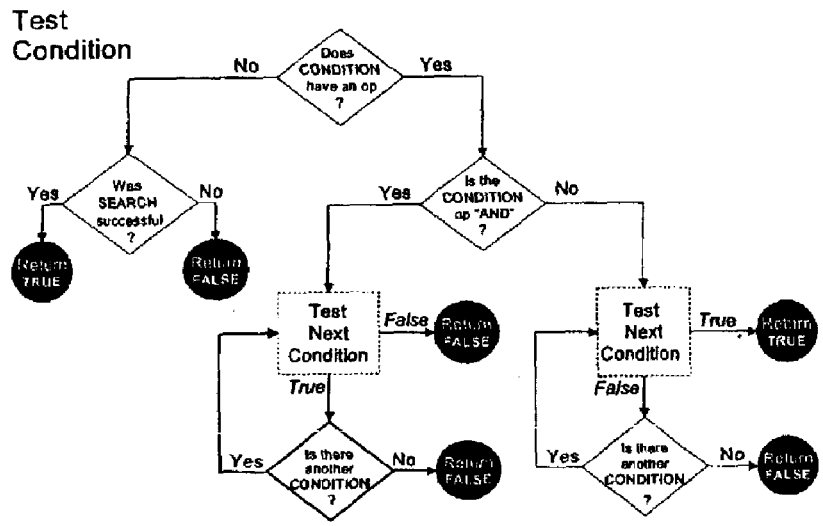

FIG-10

CLASSIFY command

```
<CLASSIFY op="operation">
    <FROM>
        documents
    </FROM>
    <WHERE>
        anchor
    </WHERE>
    <USING profile="profile">
</CLASSIFY>
``` where: *operation* is "execute" to classify documents
       *anchor* is XML document containing values used as search criteria
       *documents* is one or more DOCUMENT elements indicating documents to be classified
       *profile* is identifier of the profile for the classification.

FIG-11

FROM-Clause

```
<FROM>
        documents
</FROM>
``` where: *documents*     is one of the following:
- DOCUMENT elements giving names and search schema
- DOCUMENT element with name="*" for whole set
- Complete documents inside <DOCUMENT> tags

FIG-12A

```
<FROM>
    <DOCUMENT name="1" schema="acme_products"/>
    <DOCUMENT name="2" schema="acme_products"/>
    <DOCUMENT name="3" schema="acme_products"/>
</FROM>
```

FIG-12B

```
<FROM>
    <DOCUMENT name="*" schema="acme_products"/>
</FROM>
```

FIG-12C

```
<FROM>
    <DOCUMENT schema="acme_products">
        <Product>
            <Type>DVD Player</Type>
            <Model>
                <Number>A1000</Number>
            </Model>
            <Manufacturer>Acme</Manufacturer>
        </Product>
    </DOCUMENT>
    <DOCUMENT schema="acme_products">
        <Product>
            <Type>DVD Pro</Type>
            <Model>
                <Number>A1100</Number>
            </Model>
            <Manufacturer>Acme</Manufacturer>
        </Product>
    </DOCUMENT>
    <DOCUMENT schema="acme_products">
        <Product>
            <Type>Super DVD</Type>
            <Model>
                <Number>A1200</Number>
            </Model>
            <Manufacturer>Acme</Manufacturer>
        </Product>
    </DOCUMENT>
</FROM>
```

FIG-12D

WHERE-Clause

```
<WHERE>
    anchor
</WHERE>
``` where: *anchor* is an anchor document structure populated with values to be used as a filter on the documents

FIG-13A

```
<WHERE>
    <Product>
        <Type>DVD Player</Type>
        <Model>
            <Number>A1000</Number>
        </Model>
        <Manufacturer>Acme</Manufacturer>
    </Product>
</WHERE>
```

FIG-13B

USING-Clause

```
<USING profile="profile" />
``` where: *profile*    is the id of classification profile in the SSE's CLASSIFICATION_PROFILE file

FIG-14A

```
<USING profile="1">
```

FIG-14B

```
<RESPONSE id="id">
    <RESULT>
    <RC>code</RC>
    <MESSAGE>Processing record n of m records. Record i successfully classified.
    Classification Processing Complete. Success: x  Failed: y</MESSAGE>
    <PKEY name="key">
        <CLASS_ID>class</CLASS_ID>
        <CLASS>name</CLASS>
        <RANK>rank</RANK>
        <SCORE>score</SCORE>
        <RC>code</RC>
    </PKEY>
    </RESULT>
</RESPONSE>
``` where: 
- *id*    is a unique identifier for the classification
- *code*    is a return code indicating the state of the operation
- *n*    is a count of documents classified
- *m*    is the total number of documents in the Input File
- *x*    is the number of documents successfully classified
- *y*    is the number of documents unsuccessfully classified
- *key*    is the primary key associated with the Input document
- *class*    is the class ID of the resulting classification
- *name*    is the class name of the resulting classification
- *rank*    is the class rank of the resulting classification
- *score*    is the classification score

SYSTEM AND METHOD FOR CLASSIFICATION OF DOCUMENTS

CROSS REFERENCE TO RELATED APPLICATIONS

This application claims benefit of U. S. Provisional Application No. 60/319,138, filed on Mar. 6, 2002.

BACKGROUND OF INVENTION

The invention relates generally to the field of classification of documents contained within large enterprise databases. More particularly, the invention relates to classification engines that classify documents by performing similarity searches to match classification profile data to data found in external databases containing known class data.

Information resources often contain large amounts of information that may be useful only if there exists the capability to segment the information into manageable and meaningful packets. Database technology provides adequate means for identifying and exactly matching disparate data records to provide a binary output indicative of a match. However, in many cases, users wish to classify information contained in databases based on inexact but similar attributes. This is particularly true in the case where the database records may be incomplete, contain errors, or are inaccurate. It is also sometimes useful to be able to narrow the number of possibilities for producing irrelevant classifications reported by traditional database classification programs. Traditional classification methods that make use of exact, partial and range retrieval paradigms do not satisfy the content-based retrieval requirements of many users.

Many existing classification systems require significant user training and model building to make effective use the system. These models are very time-consuming to generate and to maintain. Another disadvantage with many model-based classification systems is that they appear as a black box to a user and only provide the resulting class or grade without any explanation of how the resultant conclusion was reached. The information regarding the conclusion is valuable if additional analysis is required to validate the conclusion. Some classification systems use a large set of complex rules that process data directly. These rules are difficult to generate and even more difficult to maintain because they contain many complex attributes.

SUMMARY OF INVENTION

The present invention provides a new method of classifying documents that makes use of many of the desirable characteristics of similarity search engines. The invention concerns the use of Similarity Search Technology described in U.S. Pat. No. 6,829,606, entitled Similarity Search Engine for Use with Relational Databases filed on Feb. 13, 2003, to provide a new method of classifying documents. This U.S. patent was issued on Dec. 7, 2004 and is incorporated herein by reference. This classification method differs from other classification methods in that it performs similarity searches to match data drawn from the documents to be classified to data found in external databases containing known class data. Because the similarity search is performed on an existing known class data, the returning search score already contains the grading information that can be applied directly to the classification criteria. Matches and near-matches as determined by a similarity search are evaluated by a set of classification rules to determine whether documents satisfy predefined classification criteria. In addition to making classification decisions based on properties derived from similarity search scores, this method is able to make classification decisions based on scores obtained from external analyses of the document in question, and to make classification decisions based on a combination of similarity scores and external analytics. The present invention uses a small set of high-level decision rules that analyze the results returned by a mathematical scoring engine. Since these rules only contain a small number of attributes, they are simple to define and maintain.

A unique feature of the invention is its ability to return along with the classification result a score that reflects a given document's rating relative to others in its class according to predetermined scoring thresholds. Another unique feature of the present invention is the ability to justify every classification results. Along with every decision, it provides the user with reasons why the conclusion for the classification was reached. This information may be important for many applications, especially when performing fraud or threat analysis or where additional analysis needs to be performed to validate the conclusion. Along with justifications data, all additional search results generated by all classification rules are available following the classification. This is one of many unique features of the present invention and separates it from the other classification techniques.

A method having features of the present invention for classification of documents comprises the steps of receiving a classify command from a client for initiating a classification of documents, the classify instruction identifying input documents to be classified, a classification profile, and anchor values, retrieving the classification profile and input documents, extracting input values from each input document based on the anchor values, structuring the input values according to a search schema identified in the classification profile, performing similarity searches for determining similarity scores between one or more database documents and each input document, and classifying the input documents based on the classification profile and the similarity scores using classes and rules identified in the classification profile. The step of performing similarity searches may comprise performing similarity searches for determining normalized similarity scores having values of between 0.00 and 1.00 for the one or more database documents for indicating a degree of similarity between the one or more database documents and each input document, whereby a normalized similarity score of 0.00 represents no similarity matching, a value of 1.00 represents exact similarity matching, and scores between 0.00 and 1.00 represent degrees of similarity matching. The step of retrieving the classification profile and input documents may comprise retrieving the classification profile and input documents having repeating groups. The method may further comprise the steps of storing the classified input documents in a results database, and notifying the client of completion of the classify command. The step of storing the classified input documents may comprise storing the classified input documents as a classification results file in a results database. The step of storing the classified input documents may comprise storing the classified input documents in an output target database identified in the classification profile. Each of the classes identified in the classification profile may comprise an identification attribute, a name element, and a rank element. The method may further comprise a low score element and a high score element for defining lower and upper thresholds for similarity scores associated with the class. Each of the rules identified in the classification profile may comprise an identification attribute, a description element, and a condition element. The method may further comprise property elements for describing conditions for including a document in a parent class. The method may further comprise the step of mapping between defined classes and defined rules using class rule map files. The step of classifying the input documents may be selected from the group consisting of classifying the input documents based on a threshold using a top score from results of more than one search schema, classifying the input documents based on a logical relationship and a threshold using a top score from more results of more than one search schema, classifying the input documents based on a number of search results for a single schema that have scores greater than a threshold, and classifying the input documents based on a number of search results from multiple schemas having scores above a threshold. The step of classifying the input documents may further comprise classifying multiple input documents based on the classification profile and the similarity scores using classes and rules identified in the classification profile using a classify utility. A computer-readable medium may contain instructions for controlling a computer system to implement the method above.

Another embodiment of the present invention is a system for classification of documents, comprising a classification engine for receiving a classify command from a client for initiating a classification of documents, the classify instruction identifying input documents to be classified, a classification profile, and anchor values, the classification engine for retrieving the classification profile and input documents from a virtual document manager, the classification engine for extracting input values from each input document based on the anchor values, an XML transformation engine for structuring the input values according to a search schema identified in the classification profile, a search manager for performing similarity searches for determining similarity scores between one or more database documents and each input document, and the classification engine for classifying the input documents based on profile and the similarity scores using classes and rules identified in the classification profile. The search manager may perform similarity searches comprises performing similarity searches for determining normalized similarity scores having values of between 0.00 and 1.00 for the one or more database documents for indicating a degree of similarity between the one or more database documents and each input document, whereby a normalized similarity score of 0.00 represents no similarity matching, a value of 1.00 represents exact similarity matching, and scores between 0.00 and 1.00 represent degrees of similarity matching. The classification engine may retrieve the classification profile and input documents having repeating groups. The system may further comprise the classification engine for storing the classified input documents in a results database and notifying the client of completion of the classify command. The classification engine may store the classified input documents as a classification results file in a results database. The classification engine may store the classified input documents in an output target database identified in the classification profile. Each of the classes identified in the classification profile may comprise an identification attribute, a name element, and a rank element. The system may further comprise a low score element and a high score element for defining lower and upper thresholds for similarity scores associated with the class. Each of the rules identified in the classification profile may comprise an identification attribute, a description element, and a condition element. The system may further comprise property elements for describing conditions for including a document in a parent class. The system may further comprise the classification for mapping between defined classes and defined rules using class rule map files. The classification engine for classifying the input documents may be selected from the group consisting of means for classifying the input documents based on a threshold using a top score from results of more than one search schema, means for classifying the input documents based on a logical relationship and a threshold using a top score from more results of more than one search schema, means for classifying the input documents based on a number of search results for a single schema that have scores greater than a threshold, and means for classifying the input documents based on a number of search results from multiple schemas having scores above a threshold. The classification engine may further comprise means for classifying the multiple input documents based on profile and the similarity scores using classes and rules identified in the classification profile using a classify utility.

An alternative embodiment of the present invention is a system for classification of documents comprising a classification engine for accepting a classify command from a client, retrieving a classification profile, classifying input documents based on similarity scores, rules and classes, storing document classification results in a database, and notifying the client of completion of the classify command, a virtual document manager for providing input documents, an XML transformation engine for structuring the input values according to a search schema identified in the classification profile, and a search manager for performing similarity searches for determining similarity scores between one or more database documents and each input document. The system may further comprise an output queue for temporarily storing classified documents. The system may further comprise a database management system for storing classification results.

In yet another embodiment of the present invention, a method for classification of documents comprises receiving a classify command from a client, the classify command designating input document elements for names and search schema, anchor document structure and values to be used as classification filters, and a classification profile, retrieving the designated classification profile, the classification profile designating classes files for name, rank and score thresholds, rules files for nested conditions, properties, schema mapping, score threshold ranges and number of required documents, and class rules maps for class identification, class type, rule identification, description, property, score threshold ranges and document count, retrieving the designated input documents, identifying a schema mapping file for each input document, determining a degree of similarity between each input document and anchor document, classifying the input documents according to the designated classes files and rules files, and creating and storing a classification results file in a database. The number of documents classified may be designated in the rules files. The method may further comprise notifying the client of completion of the classify command.

BRIEF DESCRIPTION OF DRAWINGS

These and other features, aspects and advantages of the present invention will become better understood with regard to the following description, appended claims, and accompanying drawings wherein:

FIG. 3A shows the CLASSES file;

FIG. 3B shows a reserved system-defined CLASS attribute;

FIG. 3C shows an example CLASSES instance;

FIG. 4A shows a RULES file;

FIG. 4B shows an example of a RULES instance;

FIG. 5A shows a CLASS_RULE_MAPS file;

FIG. 5B shows an example of a CLASS_RULES_MAPS instance;

FIG. 6A shows a SCHEMA_MAPPING file;

FIG. 6B shows an example of a SCHEMA_MAPPING instance;

FIG. 7A shows a CLASSIFICATION_RESULTS file;

FIG. 7B shows an example of a CLASSIFICATION_RESULTS instance;

FIG. 7C shows the normalization formulas used for computing Class Scores;

FIG. 8A shows a CLASSIFICATION_PROFILE file;

FIG. 8B shows an example of a CLASSIFICATION_PROFILE instance;

FIG. 10 shows a flowchart of the classification process;

FIG. 11 shows an XCL CLASSIFY command;

FIG. 12A shows a FROM-clause;

FIG. 12B shows an example of a FROM-clause instance with multiple input documents;

FIG. 12C shows an example of a FROM-clause instance for an entire set;

FIG. 12D shows an example of a FROM-clause instance with specific documents;

FIG. 13A shows a WHERE-clause;

FIG. 13B shows an example of a FROM-clause instance;

FIG. 14A shows a USING-clause;

FIG. 14B shows an example of a USING-clause instance; and

FIG. 15 shows a RESPONSE for a CLASSIFY command.

DETAILED DESCRIPTION

Figures 1, 2:
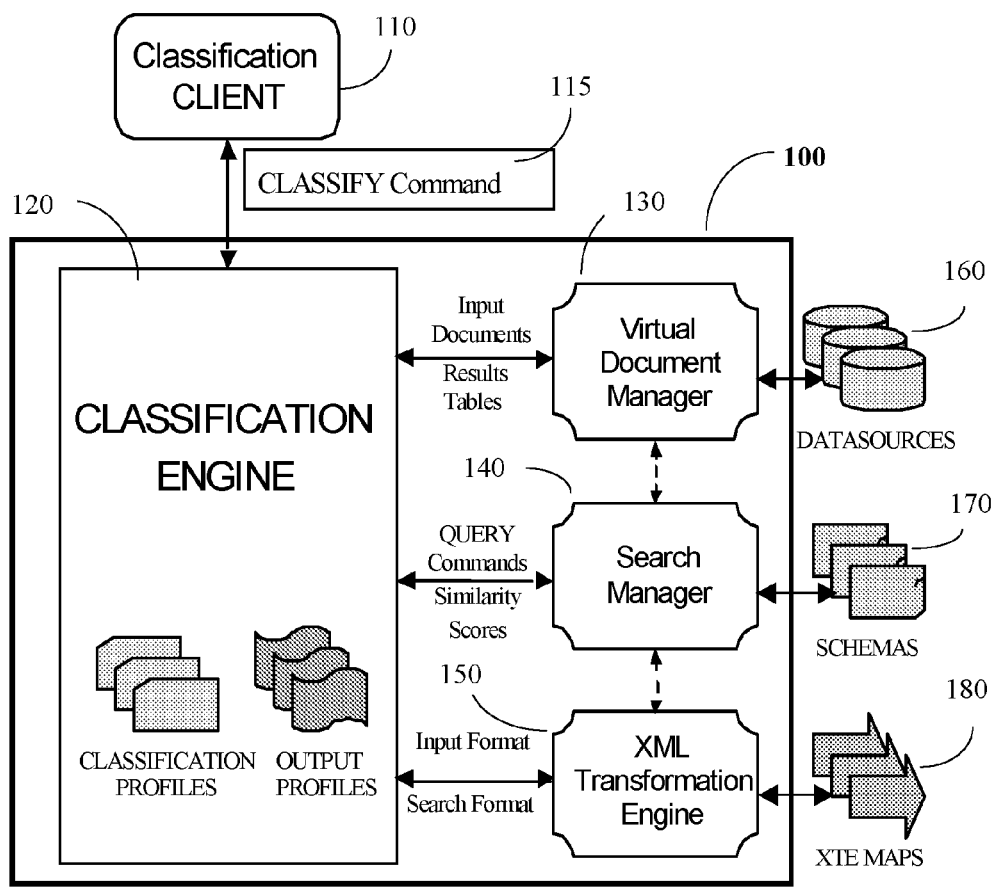
FIG. 1 shows a classification engine within the framework of a similarity search engine.
FIG. 2 shows a search that is for a claim containing a doctor with a name Falstaff.

Turning to FIG. 1, the Classification Engine (CE) 120 operates within the framework of the Similarity Search Engine (SSE) 100, employing the services of the SSE's Virtual Document Manager (VDM) 130, Search Manager (SM) 140, and XML Transformation Engine (XTE) 150. The VDM 130 is used by the CE 120 to access the documents to be classified, and by the SM 140 to access the databases 160 the CE 120 needs to search. The SM 140 performs similarity searches requested by the CE 120 and returns the results indicating the degree of similarity between the input values drawn from the input documents and the target values found in the search databases. The XTE 150 enables the CE 120 to move data from one hierarchical form to another, which is necessary for searching across disparate databases.

The CE 120 is a general-purpose classification server designed to support a range of client applications. A typical interactive client 110 might employ the CE 120 to classify incoming documents as they are received—for instance, an insurance claim form being considered for immediate payment or referral for investigation. A batch client 110 might use the CE 120 to classify a collection of documents—for instance, to re-evaluate a set of insurance claims based on new information received regarding a claimant. Though these examples are drawn from the insurance industry, the CE 120 can operate on any sort of document and with any set of document categories.

The Classification Client 110 interacts with the CE 120 by means of a CLASSIFY command 115, which is part of the XML Command Language for the SSE 100. The client 110 issues a CLASSIFY command 115 to request the CE 120 to classify the indicated input documents and deposit the results into a designated database. A batch utility has been developed in conjunction with the CE 120 and represents one implementation of a batch-mode CE client 110.

The Classification Engine 120 is the server program that carries out CLASSIFY commands 115, assisted by the VDM 130, SM 140, and XTE 150. Based on the CLASSIFY command from the Classification Client, the CE 120 receives input documents from a staging database via VDM 130 and places them into an input queue for classification. The CE 120 uses a Classification Profile, shown in FIG. 8A and FIG. 8B and described below, to determine what searches to conduct in order to classify the input documents. It uses XTE 150 to extract input values from the input documents that match anchor values for use as search criteria. It then passes the SM 140 a set of queries to execute to determine whether values similar to those input values from the input documents are to be found in the target documents in the databases available to the SM 140. Using a set of classification rules, the CE 120 compares the similarity scores from the completed queries to predefined thresholds. If the requisite number of searches returns scores within the designated thresholds, a rule is regarded to be true and the input document is classified accordingly. The CE 120 contains one or more classes and one or more classification rules. Each defined class has one or more rules that are used to identify the class criteria. Once all the rules are executed and the classification is complete, the classified input documents are moved onto an output queue and the classifications are written to tables in a specified database.

The CE 120 is designed in such way that it can use any scoring modules behaving similar to the SSE. It has the ability to classify using rules and scores representing the likelihood of finding the search document inside a known class dataset. This includes datasets represented by predictive models trained by other mathematical model-based systems, i.e. Neural Networks. By using rules and thresholds, it is able to reach a conclusion about the class by analyzing the combination of all scores returned from all scoring modules.

The Virtual Document Manager 130 is responsible for reading documents for classification by the CE 120 and for providing the Search Manager 140 with access to the databases containing the data used in the classification operation. The documents managed by VDM 130 are structured hierarchically according to the industry-standard Extensible Markup Language (XML). These hierarchical documents have a top-level element (known as the root) that contains other elements (known as its children). Child elements can have children of their own, and they can contain individual data values (known as leaf elements). It is the nesting of child elements that gives the XML document its hierarchical form. Because an element can have zero, one, or multiple occurrences of a child, the XML format can be used to represent about any kind of document. Multiply occurring elements are known as repeating groups.

The documents managed by VDM 130 are virtual in the sense that their values are not stored in text strings, as is the case with most XML documents. Instead, when a document is accessed, the VDM 130 obtains the appropriate values from a designated datasource, often a relational database but not limited to this storage method. It uses a document definition known as a search schema to create the structure of the document and to map values to its elements. To clients of the VDM 130, it appears that XML text strings are being read and written.

The Search Manager (SM) 140 performs similarity searches according to QUERY commands from its clients. A QUERY command contains a WHERE-clause that sets out the criteria for the search, a list of measures to be used to assess the similarity of the database values in the databases being searched to the values given in the QUERY, and (optionally) some limits on the volume of output documents to be returned.

The SM 140 has a library of similarity measures developed to handle different kinds of data. Some of these compare whole values and others break complex values down into their constituent parts. Each measure is able to compare two values of the same type and to return a score indicating the level of similarity between the two. Measures differ in kinds of data they examine, so that the score coming from a specialized "personal_address" measure might be more accurate than the score from the more generic "text" measure that does not have knowledge of how addresses are formatted. When a search involves more than one element, the scores for all the comparisons are combined using a weighted average. These weights reflect the relative importance of the elements such that those of the highest importance can be assigned higher weights and therefore contribute more to the overall score for the search.

Similarity scores range from 0.00 to 1.00 where a zero score means no similarity and one means the values are identical. By default, the SM 140 examines all the values in the designated database, scores them all against the search criteria, and returns a Result Set containing a score for each document drawn from the database. However, since the default Result Set could contain an entry for every document in the database and the lower scores may not be of interest to the application, the SM 140 can filter the Result Set according to the number of documents or range of scores. This is controlled by the SELECT-clause in the query.

The XML Transformation Engine (XTE) 150 is an internal service to the SSE, responsible for moving values from one hierarchical document format to another. For instance, the XTE 150 can transform a personal name given as a single string into separate values for First, Middle, and Last. It does this by applying matching rules to the names of the data items to find counterparts and by decomposing/recomposing their data values according to another set of rules. The XTE 150 can also employ a synonym table to quickly resolve known mappings. The CE 120 uses the XTE 150 to extract data values from the input documents into the formats required for the searches it issues. This allows the CE 120 to search across multiple databases, even when they differ in the way their data is structured.

As part of the SSE, the CE 120 uses schemas and result documents maintained by the SSE. In the vernacular of the SSE, a schema is an XML document that contains a <STRUCTURE> element defining the structure of the document, a <MAPPING> element that ties elements of the document to fields in the database, and a <SEMANTICS> element that associates similarity measures with the elements of the documents that the schema describes.

The SSE Document Schema describes the contents of a database to be searched by the SM 140. However, it is not used directly in the search. Instead the XTE 150 uses the document schema to locate counterparts for the elements of the input document in the database to be searched. Only the <STRUCTURE> portion of the schema is used. The measures for the searches come from the search schemas. Through the VDM 130, the contents of the database can thereby be seen as a collection of XML documents, structured according to the hierarchy defined in the document schema.

The SSE Search Schema 170 describes a search to be performed when the CE 120 evaluates an input document to determine whether it conforms to the classification rules. Its STRUCTURE-clause may consist of one or several elements structured hierarchically according to the document structure defined by the document schema. However, it typically contains a subset of those elements—i.e. the ones for the data values involved in the search. Its MAPPING-clause indicates the mapping of elements to fields in the datasource to be searched—i.e. the database described by the document schema. Its WHERE-clause is populated by XTE 150 using values from the input document. Its SEMANTICS-clause specifies the measures to be used in evaluating target documents for similarity to the values taken from the input document.

The XTE profile 180 describes the mapping of values from the input document to the structure of a search schema. It contains a STRATEGIES element that lists the comparisons made to find the counterpart for a given element in the target database, a set of MAPPING elements that pair source values to target elements, and a set of SYNONYMS that allow elements to be recognized under several names.

The Input Profile is an SSE document schema that describes the structure of the input documents. Only the <STRUCTURE> and <MAPPINGS> are used. Since the input documents are not used directly—they provide values for the search schemas—no <SEMANTICS> are required.

The Input Search Criterion document (WHERE-clause) used to anchor the searches issued by the CE 120 are drawn from the input documents by the XTE 150. The output of the XTE 150 is a structure that conforms to the schema of the datasource to be searched and populated with the corresponding values from the input document. This structure becomes the contents of the WHERE-clause in the QUERY issued to the SSE that carries out the search.

Turning to FIG. 2, FIG. 2 shows a search that is for a CLAIM that contains a DOCTOR element containing a NAME element with the value "Falstaff". In the case of a repeating group, each instance of the group is used to generate a different Input Search Criterion document. If there are multiple repeating groups, all permutations are generated.

The XML Command Language defines a standard format for the SSE result document. Options are available for including additional data with the results, but the default format is used by the CE. The results of a search are presented as an XML document containing a <RESPONSE> element that (in the case of a successfully completed search) contains a <RESULT> element, that in turn contains a set of DOCUMENT elements. The DOCUMENT elements have no children. Each contains three attributes: the similarity score computed for the document, the unique Identifier of the document, and the name of the schema used for the search. By default, <RESULT> contains a DOCUMENT element for every document in the database. Since low-scoring documents are seldom of interest, it is possible to limit the number of <DOCUMENT> elements in the <RESULT> set by specifying a threshold score or maximum number of documents to return. The CE obtains these values from the Rules used to classify the documents.

The Classification Engine uses a set of XML files, referred to as CE Classification Files, to define the classification rules and the searches they require. Ordinarily, these are located in the local filesystem of the server where the CE resides. The .xml extension is used to indicate that the file is formatted as a text string according to the rules of XML. The CE Classification Files designate CLASSES.xml files, a RULES.xml files and CLASS_RULE_MAPS.xml files. These Classification Files are described below in relation to FIG. 3A through FIG. 5B.

Turning to FIG. 3A, FIG. 3A shows the CLASSES.xml file that describes the categories into which documents are classified. The file contains one or more CLASS elements, each defining one of the categories. Each class has an ID attribute, a NAME element, and a RANK element. The value of the ID attribute is a unique identifier for the class. The value of the NAME element provides a descriptive name for use in displays and reports. The value of the RANK element indicates the place of this class in the hierarchy of classes. A RANK value of 1 is the highest level in the hierarchy. It is possible for more than one class to have the same rank. Each class may optionally have LOW_SCORE and HIGH_SCORE elements that define the upper and lower thresholds for scores associated with the class.

FIG. 3B shows a system-defined CLASS attribute that is reserved for documents that do not fall into any defined class.

Turning to FIG. 3C, FIG. 3C shows an example of a CLASSES instance where four classes are defined, each with a unique integer ID. The class hierarchy is reflected in Table 1 and the CLASS file example is shown in FIG. 3C. Note that BLUE and GREEN have the same rank. This system is designed to handle thousands of hierarchically defined classes, in terms of grades. The hierarchy identifies the priority or the rank of each grade and is used to order the execution priority of rules for each class. The higher ranked class and its rules will always override the lower ranked ones.

TABLE 1

| RANK | ID | NAME |
|------|----|----|
| 1 | 1 | RED |
| 2 | 2 | YELLOW |
| 3 | 3 | GREEN |
| 3 | 4 | BLUE |

Turning to FIG. 4A, FIG. 4A shows a RULES.xml file. The RULES file itemizes the rules used for classification. The file contains one or more RULE elements (each with an ID attribute), a DESCRIPTION element, and a CONDITION element. The value for the ID attribute must be unique to distinguish the rule from others.

The value of the DESCRIPTION element is descriptive text for use in user displays and reports. The CONDITION element may contain PROPERTY elements that describe the search results to indicate that a document meets the conditions for inclusion in the parent CLASS. CONDITION elements can be nested, using the optional OP attribute to indicate how to combine the results of the child CONDITION elements. (Default is "AND". Absence of the OP attribute means only one PROPERTY is specified.)

A simple rule has only one PROPERTY element. A complex rule has multiple PROPERTY elements grouped together with CONDITION elements. Each PROPERTY element is uniquely identified (within the scope of the rule) by the value of its associated ID attribute. Two kinds of PROPERTY elements are defined: threshold PROPERTY elements and value PROPERTY elements. Both kinds of PROPERTY element contain a SCHEMA_MAP_ID element, and a DOCUMENT_COUNT element.

The SCHEMA_MAP_ID element is a reference to a MAP element ID in the SCHEMA_MAPPING file. (The MAP element indicates the schema for the search and any XTE transformation required. See CLASS_RULE_MAPS.xml). The DOCUMENT_COUNT element defines a default value for the required minimum number of documents with scores in the default range.

In a threshold PROPERTY, the THRESHOLD element describes a default range of scores for documents returned by the searches required for this rule. A THRESHOLD element has START and END elements, whose values define the bottom and top of the default range. Values of the OP attributes for START and END indicate whether the bottom and top values are themselves included in the range.

A combination of the THRESHOLD and DOCUMENT_COUNT elements defines the condition when a predefined number of documents meets the score range criteria. The THRESHOLD element can be used to reach a conclusion about a class when using other model-based scoring engines. The DOCUMENT_COUNT element is primarily used with the SSE to identify the likelihood, in terms of the probability, of the anchor document in the target dataset.

A value PROPERTY addresses the values themselves and contains a VALUE element that specifies the criterion value and comparison operator and contains a FIELD element that references the database table and field (column) containing target values for the comparison. A combination of the VALUE and DOCUMENT_COUNT elements defines the condition when a predefined number of documents meet the value-matching criterion.

An example rules file is shown in FIG. 4B. In the example, two rules are defined. RULE 1 specifies a search using the SANCTIONED_DOCS schema, indicated by MAP 2. Default values for the top and bottom of the threshold are set at 0.90 and 1.00. The default DOCUMENT_COUNT is set at 3. RULE 2 (<RULE ID="2">) illustrates a rules file having nested conditions, and requires two searches. Both searches must be satisfied as indicated by the AND operator in the CONDITION element of RULE ID="2". The first search uses the STOLEN_VEHICLES schema, as indicated by <SCHEMA_MAP ID> 1, and specifies an inclusive range of scores from 0.90 to 1.00. The second search uses the SANCTIONED_LAWYERS schema, as indicated by <SCHEMA_MAP ID> 3, and specifies an inclusive range of scores from 0.90 to 1.00. Table 2 shows the hierarchy of the RULES file example. In <RULE ID="2">, <PROPERTY ID="1"> containing <SCHEMA_MAP ID> 1, and <PROPERTY ID="2" containing <SCHEMA_MAP_ID> 3 represent an example of "rules files for nested conditions".

TABLE 2

| RANK | NAME | ID | Match Type | Rules | Rules Overrides |
|------|------|----|----|----|----|
| 1 | RED | C1 | Single | R1 | Threshold = .90–.100 |
|  |  |  |  | R2 | Record count = 4 |
| 2 | YELLOW | C2 | Multi | R1 |  |
|  |  |  |  | R2 |  |
| 3 | GREEN | C3 | Single | R1 | Threshold = .85–1.00 |
| 3 | BLUE | C4 | Multi | R1 |  |
|  |  |  |  | R2 |  |
|  |  |  |  | R3 |  |

Turning to FIG. 5A, FIG. 5A shows a CLASS_RULE_MAPS.xml file that defines the mapping between defined classes and defined rules (See CLASSES.xml and RULES.xml). The CLASS_RULE_MAPS contains one or more CLASS_RULE_MAP elements. Each element is uniquely identified by its associated ID attribute. The CRITERIA_MATCH_TYPE attribute of the CLASS_RULE_MAP element has two possible values that govern the processing of input documents containing repeating groups. The (default) value of "Single" indicates that once CE has search results that satisfy a rule, other repetitions do not need to be checked. A value of "Multi" means that the results of all repetitions are to be examined and retained. A CLASS_RULE_MAP element contains one or more CLASS_ID elements whose values correspond to classes defined in the CLASSES file. The RULE_MATCH_TYPE attribute for CLASS_ID has two possible values. The (default) value of "Single" indicates that rule checking can stop as soon as a single rule is met. A value of "Multi" indicates that the rule checking should continue until all rules for the class are checked and that results for all rules met are to be saved. The CLASS_ID element contains a RULE_ID element whose values correspond to rules defined in the RULES file. These are the rules to be checked for the class. A RULE_ID element can contain DESCRIPTION and PROPERTY_ID elements whose values override the defaults given in the RULES file. The value for PROPERTY_ID references the corresponding PROPERTY for the associated rule and contains elements with override values for the THRESHOLD and DOCUMENT_COUNT. The values for LOW_SCORE and HIGH_SCORE reference the associated class and provide override values for score thresholds set in CLASSES.

Turning to FIG. 5B, FIG. 5B shows an example of a CLASS_RULES_MAPS file where three mappings are specified. The first mapping assigns RULE 1 and RULE 2 to CLASS 1, which has the NAME "RED" assigned in the CLASSES file. The default values for the rules are used because no values of the rule are overridden. The second mapping assigns RULE 1 and RULE 2 to CLASS 2, which has the NAME "YELLOW". However, in this definition the defaults for the rules are overwritten. The third mapping assigns RULE 1 and RULE 2 to CLASS 3, providing a different set of override values. Where CLASS 1 and CLASS 2 have a RULE_MATCH_TYPE of "Multi", which means RULE 2 is checked even though RULE 1 evaluated true. Because CLASS_RULE_MAP 1 has a value of "Multi" for CRITERIA_MATCH_TYPE, all repetitions of the document's repeating groups are checked and all the search results are saved.

Turning to FIG. 6A, FIG. 6A shows a SCHEMA_MAPPING.xml file that describes how to map values from the input document into a schema for the search. The file contains one or MAP elements, each with an integer value for the ID attribute that uniquely identifies the map. The MAP element contains a SEARCH_SCHEMA element and an XTE_MAP element. The value of the SEARCH_SCHEMA element is the name of the schema used in the search. The schema is stored in the SCHEMAS file for the SSE that conducts the search. The value of the XTE_MAP element is the name of the XTE element in the XTE_PROFILE file. The XTE_PROFILE contains the mapping STRATEGIES, the SOURCE/TARGET mappings, and the SYNONYMS used in the transformation. The result is a SCHEMA_MAPPING suitable for use in the WHERE-clause of the QUERY command issued for the search.

Turning to FIG. 6B, FIG. 6B shows an example of a SCHEMA_MAPPING file where three schema mappings are specified.

Turning to FIG. 7A, FIG. 7A shows a CLASSIFICATION_RESULTS.xml file that describes the output produced by the CE. The TARGET element indicates where to save the results of a classification, and (optionally) the additional search results to save. Each TARGET element is uniquely identified by the value of its ID attribute, and contains exactly one DATASET element. The DATASET element contains the name of the datasource to receive the output. In the present implementation, this is a relational database. Datasources for the SSE are defined in the DATASOURCES file. The SEARCH_RESULTS element is optional. The value of the SEARCH element corresponds to the identifier of a MAP in the SCHEMA_MAPPING file that indicates the schema used in the search. The value of the COUNT element indicates the number of results to save. The SEARCH_RESULTS element may contain multiple <SEARCH> elements, but only one <COUNT> element.

Turning to FIG. 7B, FIG. 7B shows an example of a CLASSIFICATION_RESULTS.xml file where results are sent to the datasource named "classification_output". Up to 20 results from searches of the schemas specified for MAP1 and MAP 2 (STOLEN_VEHICLES and SANCTIONED_DOCS) are saved. The SCORE associated with the classification of a document is derived as follows: The highest similarity search score returned from among all Properties contained in the RULE that resulted in the classification is normalized such that lower threshold from the Property equates to 0.00 and the upper threshold from the Property equates to 1.00. This score is renormalized according to the LOW_SCORE and HIGH_SCORE thresholds for the resulting CLASS to yield a score within the CLASS thresholds proportional to its place within the thresholds for the Property.

The normalization formulas are shown in FIG. 7C. An example is a document that scores 0.60 with a Property whose thresholds are 0.50 to 0.90. The computation (0.60–0.50)/(0.90–0.50) gives 0.25 as the score normalized for those thresholds. To renormalize the score for a Class where LOW_SCORE is 0.60 and HIGH_SCORE is 0.80, the computation (0.80–0.60)*0.25+0.60 produces a renormalized class score of 0.65.

Turning now to FIG. 8A, FIG. 8A shows a CLASSIFICATION_PROFILE.xml file that drives the classification process. It describes how a classification is to be performed, what classes are to be generated, and what actions to take with a classified record. The CLASSIFICATION_PROFILE contains one or more PROFILE elements that define the kinds of classification processes available. The value for the ID attribute uniquely identifies the PROFILE. A PROFILE element contains a SOURCE_SCHEMA element and a TARGET_ID element. It may also contain a CLASS_RULE_MAP_ID. The SOURCE_SCHEMA element has only a NAME attribute whose value corresponds to the name of a schema in the SSE's SCHEMAS file. This schema is used to read the input documents to be classified. Only the STRUCTURE and MAPPING elements are used. SEMANTICS are ignored since the schema is used only for reading and mapping input documents, not for searching them. This is carried out by the search schemas. The DATASET element has only an ID attribute whose value corresponds to the identifier of a TARGET element in the CLASSIFICATION_RESULTS file that specifies the datasource to receive the output of the classification. The CLASS_RULE_MAP element has only an ID attribute whose value corresponds to the identifier of a CLASS_RULE_MAP in the CLASS_RULE_MAPS file that describes the rule mapping to use in the classification.

Turning now to FIG. 8B, FIG. 8B shows an example of the CLASSIFICATION_PROFILE.xml where the NEW_CLAIMS source schema is used to get the records to be classified. The results go to the dataset referenced by the TARGET element with the ID value of "1". The CLASS_RULE_MAP with ID value of "1" indicates the class definitions and rules employed.

Database Result tables are created when a new TARGET is defined in the CLASSIFICATION_RESULTS file. In the present embodiment, the target datasource must be a relational database where the CE has the permissions necessary for creating and updating tables. When the TARGET is specified in the CLASSIFICATION_PROFILE, it receives the output from the classification.

A number of tables are created in the specified datasource. These include a HEADER table, a CLASSRESULTS table, a SEARCHCRITERIA table, and a RULE_CRITERIA table.

A table having a HEADER TABLENAME is shown in TABLE 3.

TABLE 3

| Column Name | Description | Characteristics |
| --- | --- | --- |
| ClassificationID | The id value of the classification profile used for this classification. | INTEGER |
| PKEY_VALUE | Primary key values from the input data, | Primary Key CHAR(30) (Note: Should be defined large enough so that the largest primary key value from the input source can be stored in this column) |
| CLASS_ID | Generated highest-ranking classification class id for this key. | INTEGER |

A table having a CLASSRESULTS TABLENAME is shown in TABLE 4.

TABLE 4

| Column Name | Description | Characteristics |
| --- | --- | --- |
| PKEY_VALUE | Primary key values from the input document | Primary Key CHAR(30) (Note: Should be defined large enough so that the largest primary key value from the input source can be stored in this column) |
| RULE_ID | ID value for the rule, specified by the ID attribute in the rule definition | INTEGER |
| RULE_CRITERION_ID | System generated ID. Used to locate search criteria for the rule. | INTEGERNOTE: This value is unique per record. |
| CLASS_ID | Generated classification class id for this search criterion. | INTEGER |

A table having a SEARCHCRITERIA TABLENAME is shown in TABLE 5. Each input record generates one or more search criteria documents. A document without repeating groups generates one search criteria document. A document with repeating groups generates a search criteria document for each permutation of values.

TABLE 5

| Column Name | Description | Characteristics |
| --- | --- | --- |
| PKEY_VALUE | Primary key values from the input document | CHAR(30) (Note: Should be defined large enough so that the largest primary key value from the input source can be stored in this column) |
| SEARCH_CRIT_ID | System generated ID. Used to uniquely identify search criteria. | INTEGERNOTE: This value is unique per PKEY_VALUE. |
| SCHEMA_MAP_ID | ID value of the MAP, specified by ID attribute in SEARCH_SCHEMA_MAP definition. | INTEGER |
| SEARCH_CRIT | XML document containing the input search criteria. (See INPUT_SEARCH_CRITERIA.) | BLOB |
| RESULT_DOC | SSE result document containing document name, scheme name, and similarity score. See SSE_RESULT_DOCUMENT. | BLOB |

A table having a RULE_CRITERIA TABLENAME is shown in TABLE 6.

TABLE 6

| Column Name | Description | Characteristics |
| --- | --- | --- |
| PKEY_VALUE | Primary key values from the input data. | Primary Key CHAR (30) (Note: Should be defined large enough so that the largest primary value from the input source can be stored in this column) |
| RULE_ID | Unique identifier of the rule specified by the ID attribute in the rule definition. | INTEGER |
| RULE_CRITERION_ID | Identifier of the criterion. | INTEGERMatches values found in RULE_CRITERION_ID CLASSRESULTS table. |
| ATTRIBUTE_ID | Unique identifier of the PROPERTY specified by the ID attribute in the RULE definition. | INTEGERUnique within the scope of a RULE ID |
| CRITERION_ID | Identifier of the search criterion. | INTEGERMatches values found in SEARCH_CRITERIA_ID in the SEARCH_CRITERIA table. |

The following provides a narrative account of the process flow of a transaction carried out by the Classification Engine. As part of the SSE, the CE has access to the services of the VDM, SM, and XTE components of the SSE framework. For the most part, this narrative focuses on the actions of the CE itself with only brief descriptions of the actions of the other components as they interact with the CE.

Figure 9:
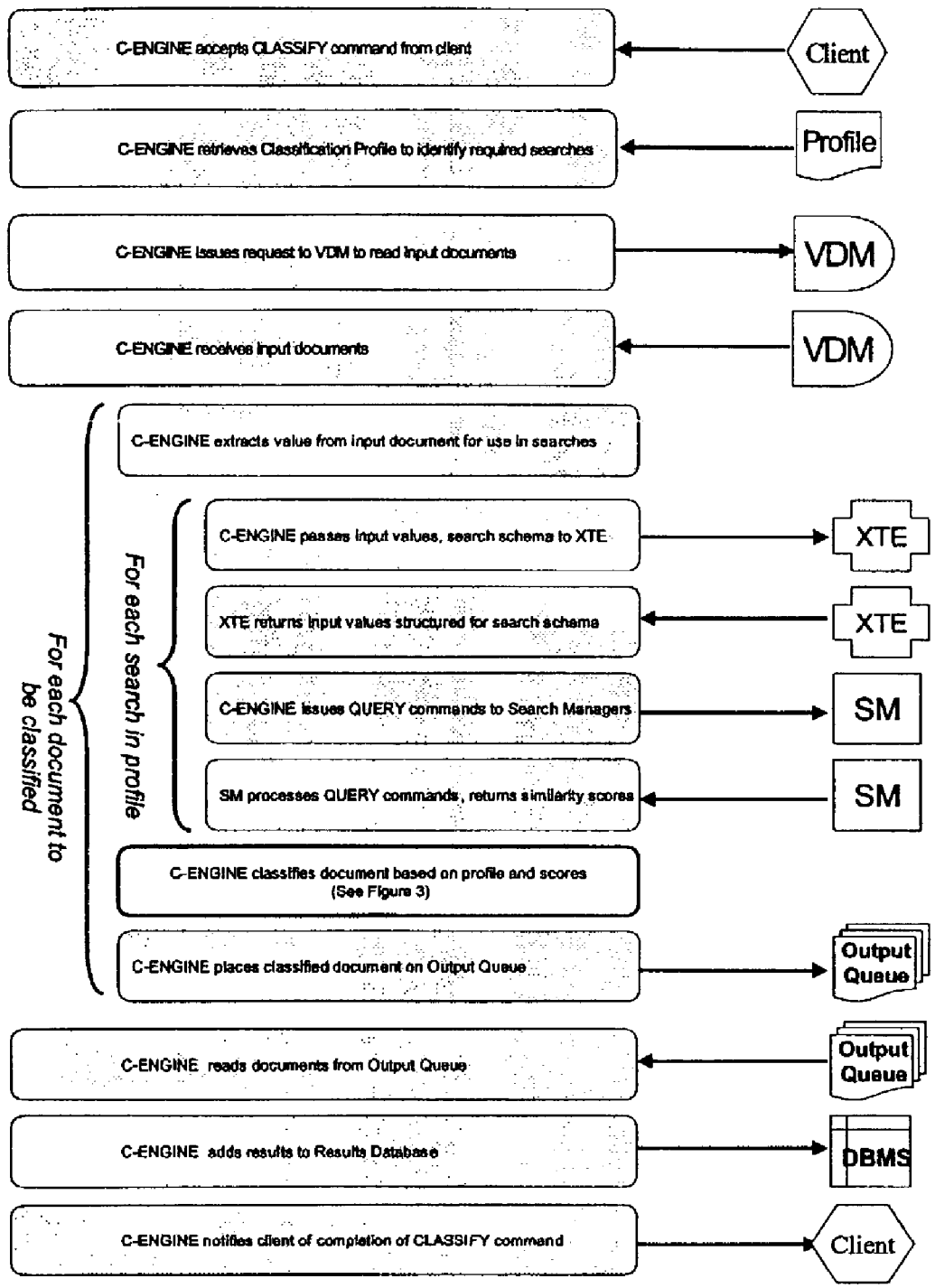
FIG. 9 shows a flowchart that depicts transaction steps of a classification engine.

Turning now to FIG. 9, FIG. 9 shows a flowchart 900 that depicts the main steps of the transactions carried out by the Classification Engine. As part of the preparations for a classification run, the collection of input documents to be classified is stored in a datasource accessible to the SSE. Ordinarily this will be a staging database devoted to this purpose. The SSE has a schema that describes the input documents so that they can be read by the CE using the XML Command Language's (XCL's) DOCUMENT command. The SSE also has schemas for the searches to be conducted by the CE during the classification run, and target datasource definitions for the databases to be searched. The CE's set of Classification files have been edited according to the requirements of the run.

Step 1: C-ENGINE accepts CLASSIFY command 902 from a client 904.

To request the CE to conduct a classification run, the client 904 (110 in FIG. 1) passes a CLASSIFY command (115 in FIG. 1) to the CE 902, using the execute method of the SSE's Java Connection class. In the SSE, a Command Handler object is instantiated to carry out the CLASSIFY command shown in FIG. 11. This is one implementation of a general-purpose command interface using XML documents to represent client requests and their results. The CLASSIFY command contains FROM, WHERE and USING clauses shown in FIG. 12A, FIG. 13A and FIG. 14A that specify the source and selection criteria of the documents to be classified and a profile describing the classifications to be performed. The FROM-clause contains one or more DOCUMENT commands that can be carried out by the VDM to provide the CE with the documents to be classified—i.e. the input documents as shown in FIG. 12A–FIG. 12D. The WHERE-clause contains selection criteria in the form of anchor values contained in anchor documents to filter the collection of input documents defined by the FROM-clause. To qualify for processing by the CE, an input document's values must match those given for the corresponding anchor values in the anchor documents specified in the WHERE-clause. The WHERE-clause is illustrated in FIG. 13A and FIG. 13B and described below. The USING-clause has a profile attribute that identifies the classification profile for the run. The USING-clause is illustrated in FIG. 14A and FIG. 14B and described below. The CLASSIFICATION_PROFILE.xml file is illustrated in FIG. 8A and FIG. 8B and described below.

Step 2: C-ENGINE retrieves Classification Profile 906 to identify required searches.

The CE prepares to begin classifying the input documents by reading the CLASSIFICATION_PROFILE file 908 to find the PROFILE specified in the USING-clause of the CLASSIFY command. From this PROFILE, the CE obtains the SOURCE_SCHEMA, DATASET, and CLASS_RULE_MAP to use for the classification run. SOURCE_SCHEMA is the schema that describes the structure and mapping of the input documents. The semantics (similarity measures) are not used. DATASET is the XCL definition of the datasource to receive the output of the classification. In the current implementation, this is a relational database for which the CE has authorizations to create and update tables. CLASS_RULE_MAP is the identifier of a CLASS_RULE_MAPS file in the CLASS_RULE_MAPS file that defines the classification scheme to be employed in the run. The classification process is shown in Step 10 and explained in detail later in the document.

Step 3: C-ENGINE issues DOCUMENT command(s) to read input documents 910.

To obtain input documents to classify, the CE issues the DOCUMENT commands 910 contained in the FROM-clause to the VDM 912. There are three main forms of the FROM-clause:

1. <FROM>
　　<DOCUMENT name="document1" schema="schema"/>
　　　　<DOCUMENT name="document2" schema="schema"/>
　　. . .
　　</FROM>

In this form, the FROM-clause contains a DOCUMENT command for each input document, identifying documents by their name and schema. With this information, the VDM 912 is able to construct the document as specified in the STRUCTURE-clause of the schema, drawing values from the datasource specified in the MAPPING-clause of the schema.

2. <FROM>
　　<DOCUMENT name="*" schema="schema"/>
　　</FROM>

In this form, the FROM-clause contain a single DOCUMENT command, using the * wildcard symbol to indicate that all documents in the set are to be returned.

VDM 912 is then able to construct the documents as specified in the STRUCTURE-clause of the schema, drawing values from the datasource specified in the MAPPING-clause of the schema.

3. <FROM>
　　<DOCUMENT schema="schema">
　　　　<Contents />
　　　　</DOCUMENT>
　　　　<DOCUMENT schema="schema">
　　　　　　<Contents />
　　　　</DOCUMENT>
　　. . .
　　</FROM>

In this form, the FROM-clause contains the input documents themselves. The DOCUMENT commands specify the schema that describes the structure of the input documents. The values are taken from the DOCUMENT commands themselves, not the datasource referenced in the MAPPING-clause of the schema. This form is most often used by a client that already has a document to be classified.

Step 4: C-ENGINE receives input documents 914.

When the VDM 912 has carried out the DOCUMENT commands from the CE, it returns them as an XCL Result Set to the CE 914. In the current implementation, to avoid swamping the CE with documents, the VDM 912 passes them in batches.

Step 5: C-ENGINE extracts values from input documents 916 to anchor searches.

In this step 916, the CE prepares to launch the searches required to classify the input documents by extracting input values to serve as the anchor criteria for the search that match the anchor values in the anchor documents specified in the WHERE clause. The combinations of values needed depend on the requirements of the searches. If the input documents contain repeating groups—i.e. elements with more than one value—the CE launches searches for each repetitive group. That is, each resulting set of input value search criteria contains a different set of values for the elements in the repeating group. In the case of multiple repeating groups, the CE creates a separate document for each permutation. For example a document with two repeating groups, one with 5 repetitions and one with 4 repetitions, would be decomposed into 20 sets of searches.

Step 6: C-ENGINE passes input values, search schema to XTE 918.

For each document to be classified, one or more searches may be required. The schemas for these searches are located in the SCHEMAS directory in the filesystem used by the SSE. In order to locate matching values in the databases to be searched, the CE must issue a QUERY command to the appropriate SM. The WHERE-clause of the QUERY command gives the values to be used as search criteria. However, there is no assurance that the structure of these anchor values in the input document is the same as the structure needed in the WHERE-clause, which needs to reflect the structure of the target database. In some cases, complex values may need to be broken down into constituent parts. In others, simple values may need to be combined. Sometimes, a synonym table is used to make substitutions. This kind of conversion is performed by the XTE 920. For each search schema defined in the maps specified in the CLASS_RULE_MAP indicated in the CLASSIFY command, the CE issues a request to the XTE 920 containing the input document and the target schema.

Step 7: XTE returns input values structured for search schema 922.

The XTE 920 receives XML transformation requests from the CE and returns an Input Search Criterion document suitable for use in the WHERE-clause of a query.

Step 8: C-ENGINE issues QUERY commands to Search Managers 924.

For each search indicated by the CLASS_RULE_MAP, the CE issues a QUERY command to the SM 926 to find documents with values that match those taken from the input document. The QUERY command consists of a WHERE-clause and a FROM-clause.

WHERE-clause: Using the Input Search Criterion document, the CE is able to construct a WHERE-clause that contains the anchor values from the input document in the structure required by the search schema.

FROM-clause: The CE constructs a FROM-clause consisting of a single DOCUMENT command that uses the wildcard designation to indicate that all documents should be searched.

Step 9: SM processes QUERY commands, returns similarity scores 928.

For each QUERY issued by the CE 928, the SM 926 returns an XCL Result Set consisting of a DOCUMENT element for every document drawn from the database being searched. The DOCUMENT element has a score attribute that indicates how well the document's values match the anchor values given as search criteria in the QUERY command. Scores range from 0.00 to 1.00, with zero indicating a total mismatch and one indicating an exact match. The score depends on the similarity measure assigned to the element in the search schema. As the SM 926 completes the searches, it places the results on a return queue for processing by the CE.

Step 10: C-ENGINE classifies document based on profile and scores 930.

As search results become available from the SM 926, the CE is able to classify the input documents according to the prevailing rules 930. In this implementation, a rule is expressed as a set of conditions that must be satisfied in order for the document to be placed in a defined class. Boolean operators (AND, OR) allow for combinations of conditions. A condition is deemed satisfied if the results of a search include a required number of documents with similarity scores within a specified range. In Step 8, on encountering a document with repeated groups of data, the CE launched searches for each repetition. The value of the CRITERIA_MATCH_TYPE element in the specified CLASS_RULE_MAP determines whether the CE regards a classification rule to be evaluated as True as soon as any of the repetitions is found to fulfill the conditions of the rule or whether the CE waits to see the results for all the resulting documents before completing the classification.

Step 11: C-ENGINE places classified document on Output Queue 932.

Documents for which classification rules evaluate as True are placed on the Output Queue 934 for assignment to the appropriate class.

Step 12: C-ENGINE reads documents from Output Queue 936.

On completion of the classification process, the CE reads the documents from the Output Queue 934.

Step 13: C-ENGINE adds results to Results Database 938.

On completion of the classification process, the CE writes the identifier of the PROFILE to the HEADER table.

For each classified document, the CE adds a row to the CLASSRESULTS table 938.

For each successful search, the CE adds a row to the SEARCHCRITERIA table 938.

For each rule evaluated as True, the CE adds a row to the RULE_CRITERIA table 938.

Step 14: C-ENGINE notifies client of completion of CLASSIFY command 942.

On completion of the classification process, the CE notifies the client 904 with an XCL Response indicating the success of the operation or the likely cause of failure 942. The classification result APIs allow CE clients to access the results of a classification via XCL commands. Java utilities are available to read the results tables and generate the appropriate XCL commands. The generated XCL document is used with the SSE java Connection class to execute the request. The 3 classes that represent the API are: Cresults; CresultDocument; and Cjustification.

The following describes a method of document classification using similarity search results. The process flow here is summarized as Step 12 of the main processing narrative. It is broken out for further detailing because it embodies the essential invention being described.

This method is based on the premise that documents can be classified according to how well their values match documents in other databases. For instance, an insurance claim might be classified as suspicious based on a match between the name of the claimant and a document with the same name drawn from a database of known fraud perpetrators. While exact match searches could find the corresponding record when the name is stored in exactly the same way, they are often defeated by inconsequential differences in the way the name is stored. For instance, on the insurance claim, the name might be written as a single string, while in the database it is broken down into First, Middle, and Last Names. Furthermore, minor differences or irregularities in the way the name is spelled or entered could foil the exact match search. For instance, the claim form may say "Charley" while the database says "Charles".

The application of similarity technology is able to overcome these barriers to finding the match in several ways. First, the ability to recognize near-matches, such as "Charley" and "Charles" means that minor differences do not eliminate a document from consideration, as is the case with exact match methods. Second, the ability of the SSE's XTE service to restructure anchor values to match the structure of the search database overcomes differences in how the data is organized, as with the case of full names vs. first-middle-last. Finally, the calculation of a similarity score as a weighted average of the scores for matches of individual values gives the SSE the ability to find the best overall matches, based on all the relevant values, and even to find a good overall match when none of the values are exactly the same.

On the other hand, similarity technology is also able to confirm non-matches with the same tolerance for differences in data representation described above. For instance, the ability to confirm that a person's name and all reasonable variations do not appear in a database of approved customers may be sufficient to classify that person as a new customer.

The CE offers four ways to classify a document based on similarity search results:

1) Take the top score from among all results from one search schema and use that to classify claim based on a threshold. For example, if the highest scoring document in SANCTIONED_DOCS matches the input document with a score of 0.90 or more, then classify the input document as "high risk".

2) Take the top score from among the results from more than one search schema and classify based on an AND/OR relationship and some threshold. For example, if the highest scoring document in SANCTIONED_DOCS matches with a score of 0.90 or more AND the highest scoring document in STOLEN_VEHICLES matches with a score of 0.80 or more, then classify the input document as "high risk".

3) Classify based on the number of search results for a single schema that have scores above some threshold. For example, if 6 monthly payment documents in PAYMENTS_RETURNED match with a score of 0.90 or better then classify the input document as "high risk".

4) Classify based on the number of search results from multiple schemas that have scores records above some threshold. For example, if 6 monthly payment documents in PAYMENTS_RETURNED_2000 match with a score of 0.90 or more AND 6 monthly payment documents in PAYMENTS_RETURNED_2001 match with a score of 0.80 or more, then classify the input document as "high risk".

The classification rules are given in the CE's classification files, described in "CE Classification Files". These are:
CLASSES—defines classes by name and rank
RULES—defines rules and conditions for evaluation
CLASS_RULE_MAPS—defines type of mapping and which rules apply to classes The processing flow for document classification is shown in FIG. 9. At this point, the searches have completed and results have been tabulated so that for each search the CE knows the number of results with scores above the given threshold.

For a simple document, the CE processes each RULE to determine whether the rule evaluates as True according to the search results. The properties in each rule are evaluated and combined into an overall rule evaluation. Each PROPERTY uses a single search result score. A CONDITION is used to logically combine its individual PROPERTY and CONDITION evaluations to compute an overall True or False result.

The rule evaluation process provides two modes of operation. One mode evaluates rules against all possible combinations of search results, regardless of whether the conditions for classification have already been satisfied. This provides extensive evaluation and classification justification information. The other mode evaluates rules in an order such that once the conditions for a classification have been satisfied, further rule processing is terminated. This provides a simple classification with minimal justification information but can result in improved operational performance. The settings for these modes of operation are defined by the CLASS_RULE_MAP CRITERIA_MATCH_TYPE.

CRITERIA_MATCH_TYPE governs the processing mode at the Class level. When CRITERIA_MATCH_TYPE is "Single", as soon as a rule fires that allows a document to be placed in that Class, its results are saved and other scores are no longer considered. This means once a classification is achieved for a Class, then no further processing is needed at that Class rank or lower. When CRITERIA_MATCH_TYPE is "Multi", all rules must be evaluated and processing continues. This provides a more complete account of the classification, since it evaluates every rule for which search results are available.

RULE_MATCH_TYPE governs the evaluation of rules in classes that contain more than one rule. When RULE_MATCH_TYPE is "Multi", then all the rules for a class must be evaluated. When RULE_MATCH_TYPE is "Single", then as soon as a rule evaluates as True, the document can be placed in that Class and no further processing is needed for that Class.

Turning to FIG. 10, FIG. 10 shows a flowchart 1000 of the classification process. The classification takes different paths for each type of condition.

1) For each property, if the required number of documents produce scores within the specified range, a property evaluates as True. Otherwise, the property evaluates as False 1020.

2) For a condition with the AND operator 1030, to evaluate as True 1040, all the properties and conditions it contains must evaluate True 1050.

3) For a condition with OR operator 1060, to evaluate as True 1060, any property or condition it contains must evaluate True 1070.

Conditions are tested recursively 1010 until the topmost condition has been evaluated. If True, then the rule has been evaluated as True.

Turning to FIG. 11, FIG. 11 shows the XCL CLASSIFY command received from a Classification Client. The XCL CLASSIFY command is an XML document which contains the necessary elements for performing a classification using the Classification Engine. The document is transmitted via the SSE execute method on the SSE java Connection class. FIG. 11 illustrates the CLASSIFY command as comprising a FROM clause, a WHERE clause and a USING clause.

Turning now to FIG. 12A, FIG. 12A shows the FROM-clause. The FROM-clause identifies the document set being classified. These are virtual documents drawn from relational datasources according to a predefined input schema. The FROM-clause offers three ways to identify the input documents. The first lists the documents individually by name. The second uses the wildcard designation "*" to request all documents in the set. The third (used primarily for debugging) includes the documents themselves in the command. Examples of each are given below.

Turning to FIG. 12B, FIG. 12B shows an example of a FROM-clause that indicates that CLASSIFY should get its input from the documents named "1", "2", and "3" in the set defined for the search schema "acme_products".

Turning to FIG. 12C, FIG. 12C shows an example of a FROM-clause that indicates CLASSIFY should examine the entire set for "acme_products":

Turning to FIG. 12D, FIG. 12D shows an example of a FROM-clause that indicates CLASSIFY should examine the documents shown. Note that the documents are unnamed and are therefore unidentified in classification outputs.

Turning now to FIG. 13A, FIG. 13A shows the WHERE-clause. The CLASSIFY command uses the WHERE-clause to filter input documents for classification. The WHERE-clause indicates the anchor values for identifying input values in the input documents contained in the DOCUMENT clause to be compared to target values drawn from the target datasources specified in the USING-clause. The anchor document identified in the WHERE-clause is structured as a hierarchy to indicate parent/child relationships, reflecting the STRUCTURE-clause of the schema. Only those identified input documents that contain input values matching the anchor values in the WHERE-clause are considered for classification.

For the Classification Engine, the WHERE-clause takes the form of an XML document structure populated with anchor values—i.e. the values that represent the "ideal" for the document filter. This document's structure conforms to the structure of the input schema. However, only the elements contributing to the filter need to be included. Hierarchical relationships among elements, which would be established with JOIN operations in SQL, are represented in SSE Command Language by the nesting of elements in the WHERE-clause. No matter where they occur in the document structure, all elements included in the WHERE-clause are used to filter document found in the associated input datasource. A classification engine WHERE-clause is used for selection. A WHERE-clause is optional in any CLASSIFY that does classification. Without a WHERE-clause, a CLASSIFY will use all documents in the FROM clause. FIG. 13B shows an example of a WHERE-clause.

Turning to FIG. 14A, FIG. 14A shows a USING-clause. The Using-clause defines which classification profile the Classification Engine should use to classify the input documents.

Turning to FIG. 14B, FIG. 14B shows an example of a USING-clause that indicates that the CLASSIFY command should use the profile with the ID "1" (MyClassification) to perform the classifications on the input documents.

A Classify utility is useful for classifying multiple documents at once. The batch classification utility allows the use of the CE without a custom-written client. The SSE SCHEMAS file must contain a schema for the documents to be classified. Executing the following command from a system console starts the utility.

Classify profile="classification profile name" [gateway=" SSE connection url"]
[uid="user id for SSE connection"] [ pwd="password for SSE connection"]

| | |
|---|---|
| profile="classification profile name" | (Required) Specifies the name of the classification profile to use for classifying records found in the input database. |

Classify profile="classification profile name" [gateway=" SSE connection url"]
[uid="user id for SSE connection"] [ pwd="password for SSE connection"]

| | |
|---|---|
| gateway="SSE connection url" | (Optional) Specifies the url to use for connnecting to the SSE gateway. The default value is localhost. Example value is: gateway="raw://localhost:5151" |
| uid="user id for SSE connection" | (Optional) Specifies the user id to use for connecting to the SSE gateway. The default value is Admin. Example value is: uid="Admin" |
| pwd="password for SSE connection" | (Optional) Specifies the password for the user that is to be used for the connection to the SSE gateway. The default value is admin. Example value is: pwd="admin" |

Once the command is executed, the classification process begins and the utility starts writing messages reporting its progress.

Turning to FIG. 15, FIG. 15 shows the RESPONSE element of the classification log resulting from the classification. The RC element provides a return code indicating the success of the operation or the error conditions that resulted in failure. The MESSAGE element contains a descriptive account of the operation, including the progress of the classification and its general results. Each document in the Input File is identified by PKEY value and classification results are given by CLASS_ID, CLASS, RANK, and SCORE.

To stop the Batch Utility issue the CLASSIFYSTOP command. Issuing the CLASSIFYSTOP command will terminate the batch Classify Utility. Terminating the program stops the classification of the remaining records that have not yet been classified. Results for records already classified are saved.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A method for classification of documents, comprising the steps of:
   receiving a classify command from a client for initiating a classification of documents, the classify command identifying input documents to be classified, a classification profile, and an anchor document containing anchor values for identifying input document values to be used as a search criteria;
   retrieving the classification profile and input documents;
   extracting input values from each input document based on the anchor values;
   structuring the input document values of each input document according to a search schema identified in the classification profile;
   performing similarity searches for determining similarity scores between one or more target database documents and the input values of each input document; and classifying the input documents based on the classification profile and the similarity scores using classes and rules identified in the classification profile.

2. The method of claim 1, wherein the step of performing similarity searches comprises performing similarity searches for determining normalized similarity scores having values of between 0.00 and 1.00 for the one or more database documents for indicating a degree of similarity between the one or more database documents and each input document, whereby a normalized similarity score of 0.00 represents no similarity matching, a value of 1.00 represents exact similarity matching, and scores between 0.00 and 1.00 represent degrees of similarity matching.

3. The method of claim 1, wherein the step of retrieving the classification profile and input documents comprises retrieving the classification profile and input documents having repeating groups.

4. The method of claim 1, further comprising the steps of:
storing the classified input documents in a results database; and
notifying the client of completion of the classify command.

5. The method of claim 4, wherein the step of storing the classified input documents comprises storing the classified input documents as a classification results file in a results database.

6. The method of claim 4, wherein the step of storing the classified input documents comprises storing the classified input documents in a results database identified in the classification profile.

7. The method of claim 1, wherein each of the classes identified in the classification profile comprises an identification attribute, a name element, and a rank element.

8. The method of claim 7, further comprising a low score element and a high score element for defining lower and upper thresholds for similarity scores associated with the class.

9. The method of claim 1, wherein each of the rules identified in the classification profile comprises an identification attribute, a description element, and a condition element.

10. The method of claim 9, further comprising property elements for describing conditions for including a document in a parent class.

11. The method of claim 1, further comprising the step of mapping between defined classes and defined rules using class rule map files.

12. The method of claim 1, wherein the step of classifying the input documents is selected from the group consisting of classifying the input documents based on a threshold using a top score from results of more than one search schema, classifying the input documents based on a logical relationship and a threshold using a top score from more results of more than one search schema, classifying the input documents based on a number of search results for a single schema that have scores greater than a threshold, and classifying the input documents based on a number of search results from multiple schemas having scores above a threshold.

13. The method of claim 1, wherein the step of classifying the input documents further comprises classifying multiple input documents based on the classification profile and the similarity scores using classes and rules identified in the classification profile using a classify utility.

14. A computer-readable medium containing instructions for controlling a computer system to implement the method of claim 1.

15. A system for classification of documents, comprising:
a classification engine for receiving a classify command from a client for initiating a classification of documents, the classify command identifying input documents to be classified, a classification profile, and an anchor document containing anchor values for identifying input document values to be used as a search criteria;
the classification engine for retrieving the classification profile and input documents from a virtual document manager;
the classification engine for extracting input values from each input document based on the anchor values;
an XML transformation engine for structuring the input document values according to a search schema identified in the classification profile;
a search manager for performing similarity searches for determining similarity scores between one or more target database documents and the input values of each input document; and
the classification engine for classifying the input documents based on profile and the similarity scores using classes and rules identified in the classification profile.

16. The system of claim 15, wherein the search manager performs similarity searches comprises performing similarity searches for determining normalized similarity scores having values of between 0.00 and 1.00 for the one or more database documents for indicating a degree of similarity between the one or more database documents and each input document, whereby a normalized similarity score of 0.00 represents no similarity matching, a value of 1.00 represents exact similarity matching, and scores between 0.00 and 1.00 represent degrees of similarity matching.

17. The system of claim 15, wherein the classification engine retrieves the classification profile and input documents having repeating groups.

18. The system of claim 15, further comprising the classification engine for storing the classified input documents in a results database and notifying the client of completion of the classify command.

19. The system of claim 18, wherein the classification engine stores the classified input documents as a classification results file in a results database.

20. The system of claim 18, wherein the classification engine stores the classified input documents in a results database identified in the classification profile.

21. system of claim 15, wherein each of the classes identified in the classification profile comprises an identification attribute, a name element, and a rank element.

22. The system of claim 21, further comprising a low score element and a high score element for defining lower and upper thresholds for similarity scores associated with the class.

23. The system of claim 15, wherein each of the rules identified in the classification profile comprises an identification attribute, a description element, and a condition element.

24. The system of claim 23, further comprising property elements for describing conditions for including a document in a parent class.

25. The system of claim 15, further comprising the classification for mapping between defined classes and defined rules using class rule map files.

26. The system of claim 15, wherein the classification engine for classifying the input documents is selected from the group consisting of means for classifying the input documents based on a threshold using a top score from results of more than one search schema, means for classifying the input documents based on a logical relationship and a threshold using a top score from more results of more than one search schema, means for classifying the input documents based on a number of search results for a single schema that have scores greater than a threshold, and means for classifying the input documents based on a number of search results from multiple schemas having scores above a threshold.

27. The system of claim 15, wherein the classification engine further comprises means for classifying the multiple input documents based on profile and the similarity scores using classes and rules identified in the classification profile using a classify utility.

28. A system for classification of documents comprising:
   a classification engine for accepting a classify command from a client, retrieving a classification profile, classifying input documents based on similarity scores, rules and classes, storing document classification results in a database, and notifying the client of completion of the classify command;
   a virtual document manager for providing input documents;
   an XML transformation engine for structuring the input document values according to a search schema identified in the classification profile; and
   a search manager for performing similarity searches for determining similarity scores between one or more target database documents and each input document.

29. The system of claim 28, further comprising an output queue for temporarily storing classified documents.

30. The system of claim 28, further comprising a database management system for storing classification results.

31. A method for classification of documents, comprising:
   receiving a classify command from a client, the classify command designating input document elements for names and search schema, anchor document structure and values to be used as classification filters, and classification files;
   retrieving the designated classification files, the classification files designating classes files for name, rank and score thresholds, rules files for nested conditions, properties, schema mapping, score threshold ranges and number of required documents, and class rules maps for class identification, class type, rule identification, description, property, score threshold ranges and document count;
   retrieving the designated input documents;
   identifying a schema mapping file for each input document;
   determining a degree of similarity between each input document values identified by the anchor document and target database documents;
   classifying the input documents according to the designated classes files and rules files; and
   creating and storing a classification results file in a database.

32. The method of claim 31, wherein the required minimum number of documents with scores in a default range is designated in the rules files.

33. The method of claim 31, further comprising notifying the client of completion of the classify command.

* * * * *